Nov. 14, 1933.  L. IVERSEN  1,935,091

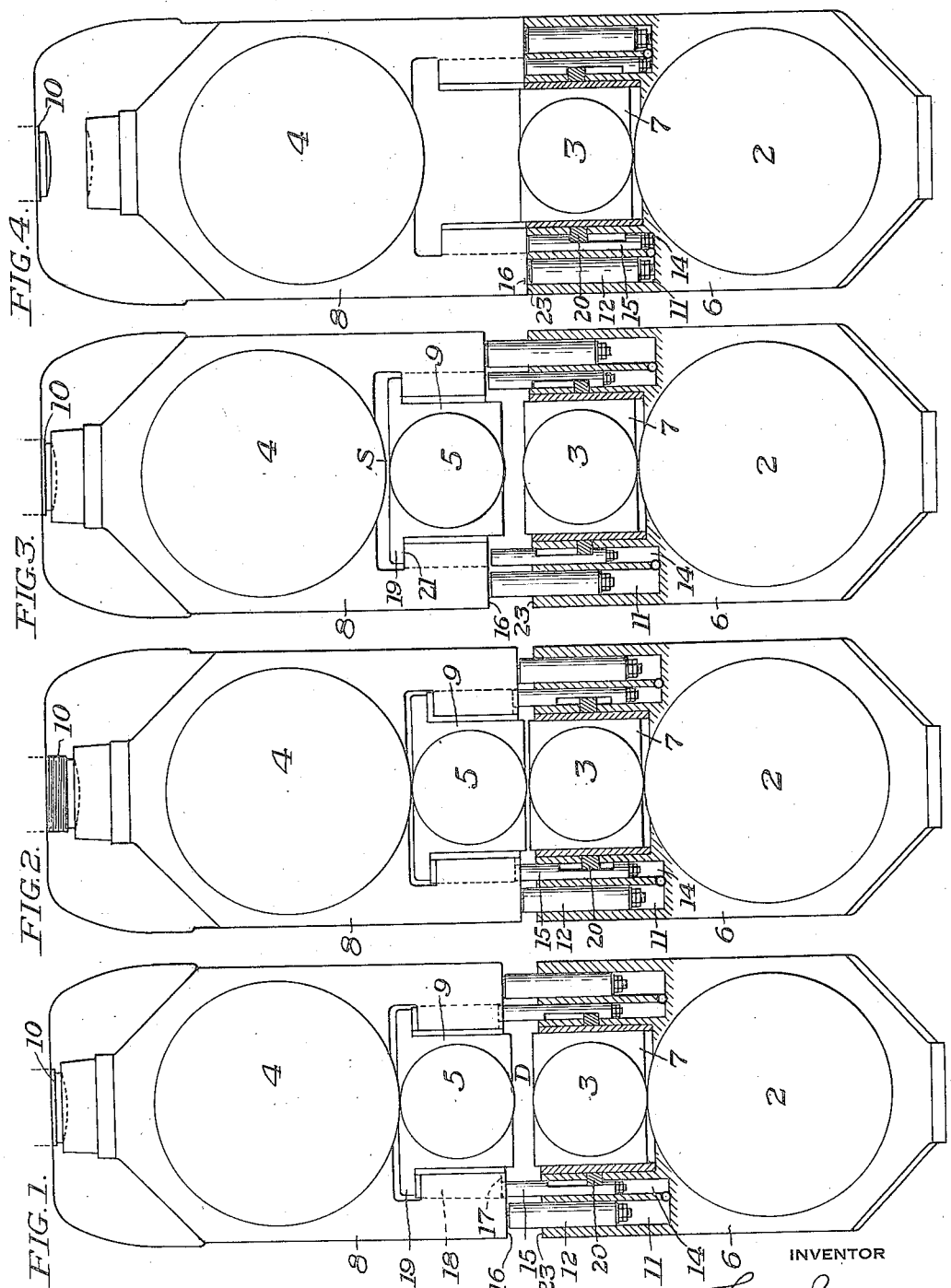

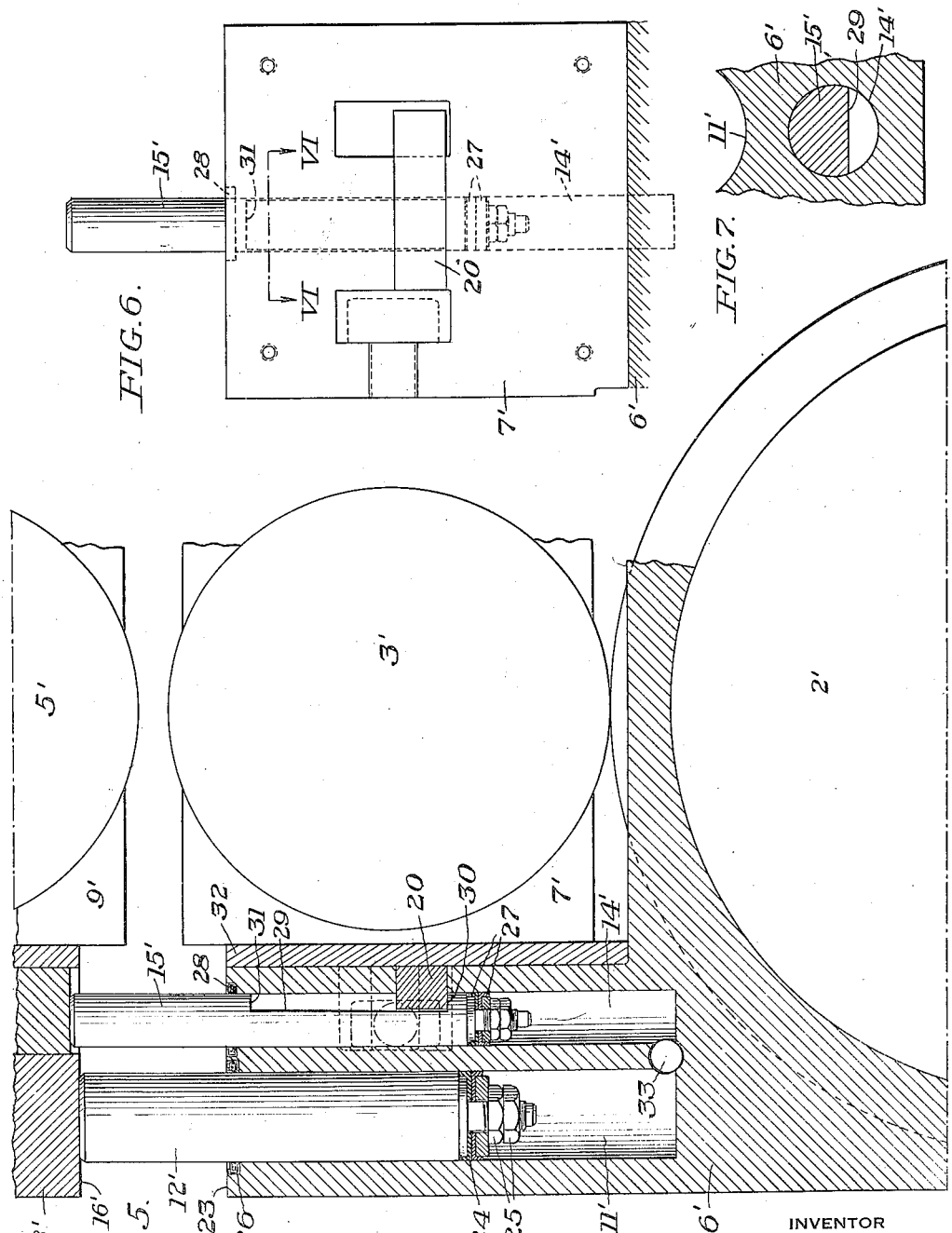

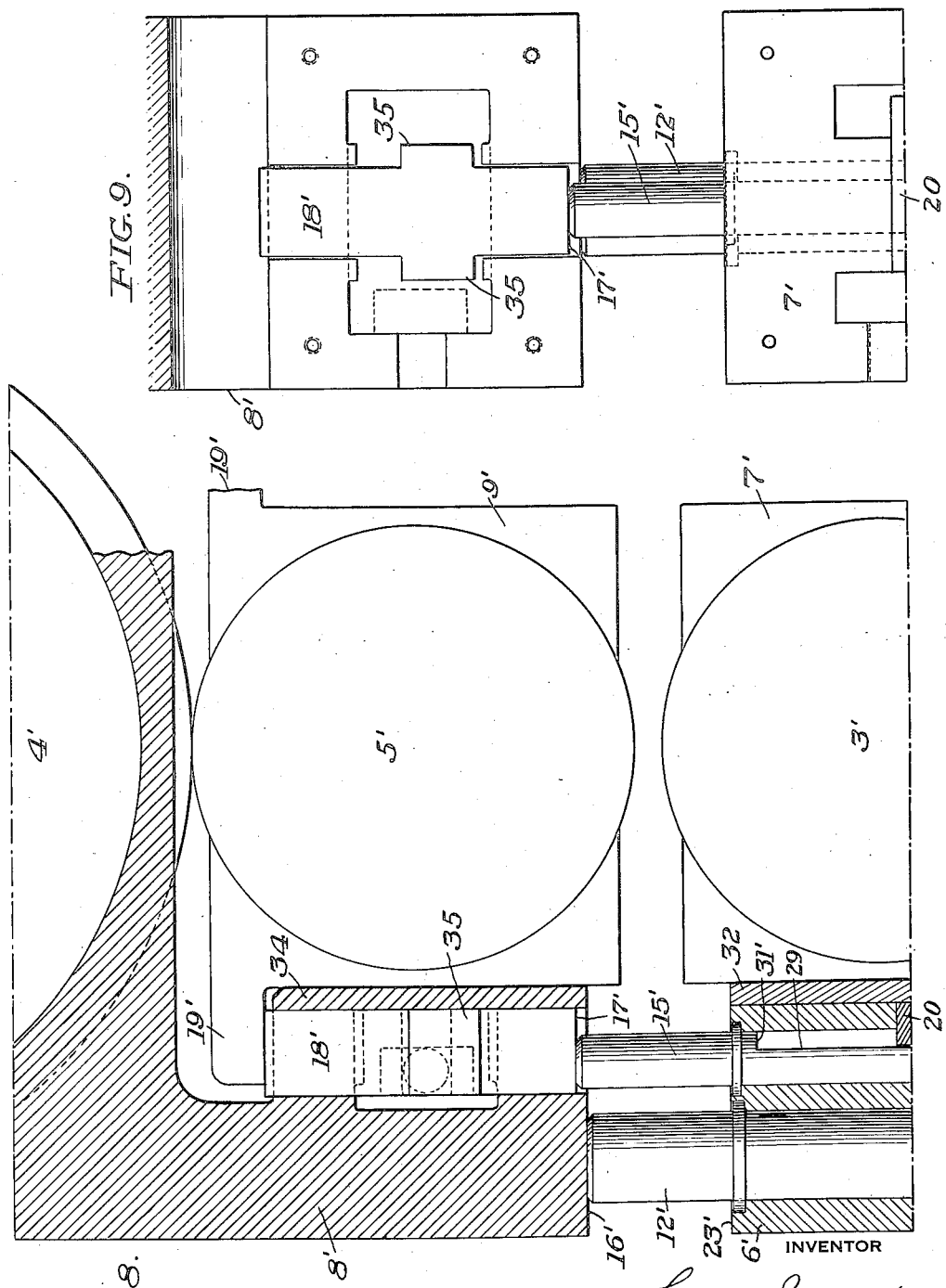

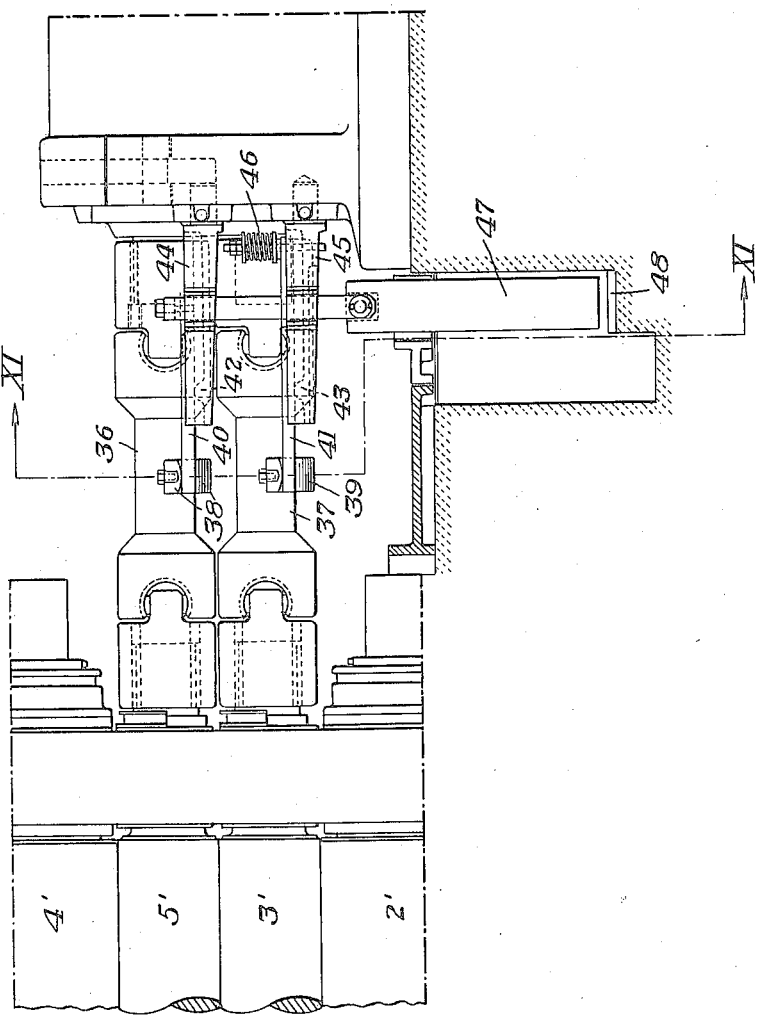
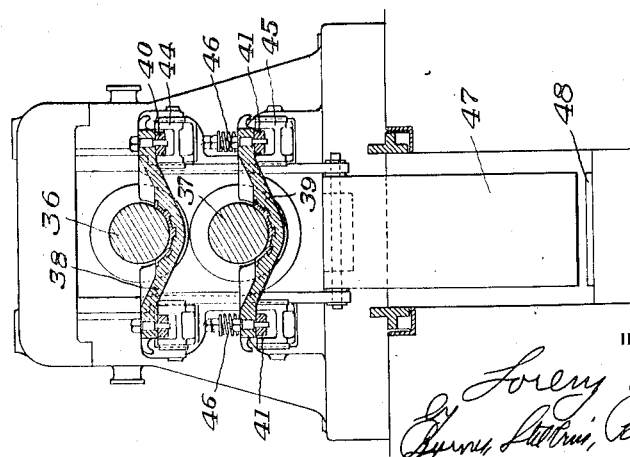

APPARATUS FOR BALANCING ROLLS

Filed July 22, 1932   6 Sheets-Sheet 5

INVENTOR

Nov. 14, 1933.      L. IVERSEN      1,935,091

APPARATUS FOR BALANCING ROLLS

Filed July 22, 1932      6 Sheets-Sheet 6

Patented Nov. 14, 1933

1,935,091

UNITED STATES PATENT OFFICE 1,935,091

APPARATUS FOR BALANCING ROLLS

Lorenz Iversen, Pittsburgh, Pa., assignor to Mesta Machine Company, Pittsburgh, Pa., a corporation of Pennsylvania Application July 22, 1932. Serial No. 623,929

20 Claims. (Cl. 80—55)

The present invention relates broadly to the art of metal working, and more particularly to improvements in rolling mills. As herein illustrated and described, the invention will be applied to rolling mills of the four-high type utilizing the usual backing-up and working rolls having different diameters.

At the present time a number of arrangements for balancing the top rolls of these and other mills are in common use. All of the different arrangements serve the primary purpose of carrying the weight of the movable or adjustable rolls, while at the same time allowing the desired movement of the rolls and their bearings in a plane passing through, or substantially through the common axes of the rolls. In case the backing-up and working rolls have their axes disposed in a common plane with their axes all extending parallel one to the other, the direction of adjustment will be exactly in the plane referred to. The purpose of such an adjustment is to enable the size of the pass provided between the working rolls to be varied in accordance with the thickness of the product which it is desired to roll.

Arrangements of the general nature referred to all possess the common principle of affording a yielding support tending to lift the weight of the movable rolls and their bearings, and to force the working rolls apart. This is desirable in certain mills, not only of the four-high type but also of the two-high type wherein it is not desired to utilize the principle of a jump mill. Against this yielding balancing support or force, the adjusting means for the rolls is made to react, commonly through the use of screws turning in suitable nuts supported by the mill housings. Springs, counterweights or hydraulic plungers are usually utilized for the general purposes hereinbefore contemplated with mills of the two-high type. Four-high mills have exactly the same requirements relative to the movable backing-up roll and, in addition to this, the movable working roll must be held against its backing-up roll by force sufficient not only to balance the weight of the working roll but also, in many cases, to provide a sufficient frictional contact between the movable working roll and its backing-up roll to drive the former from the latter.

While arrangements of the general nature indicated accomplish the desired balancing results, most, if not all of them, possess certain practical disadvantages which the present invention obviates. It is a particularly important requirement of a good roll balance device that both working rolls and backing-up rolls with their bearings can be readily removed from the mill housings in a minimum time, inasmuch as the delay incident to changing rolls, which delay is necessarily attended with the shutting down of one or more mills in a given train, is usually extremely costly.

As applied particularly to four-high mills to which my invention is especially applicable, although not limited thereto as to all of its features, my invention contemplates the provision of a compact and convenient means for balancing the weight of a working roll and its backing roll together with their bearings, without the use of springs or counterweights. Such an arrangement is particularly desirable in the case of the present day mills of large size where the weights to be handled are so great as to make the use of springs or counterweights inconvenient if not actually impracticable.

Another object of the present invention is to eliminate the use of any overhead suspension or supporting means such as would tend to cumber the top of the mill with springs, counterweights or cylinders either above, between or alongside the housings. In general, balancing devices of the suspension type, at least as hereinbefore provided, have been undesirable to the extent that they have had to be disconnected from the roll bearings before removal of the rolls could be effected.

My invention also contemplates the accomplishing of the desired balancing without the use of springs, counterweights or cylinders below the level of the bottom roll, either within, below or alongside the housings. Such devices are generally objectionable on account of their inaccessibility for inspection, adjustment or repair. In some cases, also, they have been open to the further objection that they have required cored or drilled openings in the housings themselves, with resultant loss in the strength of the housing sections.

In accordance with the present invention, certain objections of the character referred to are overcome by the use of balancing means which are self-contained within the bearing chucks themselves in such manner that they are removable with the bearing chucks during the operation of roll changing. This obviously facilitates the roll changing operation, thereby permitting it to be performed in connection either with the working rolls or backing-up rolls with a minimum of delay.

As an incident to the operation of roll changing, consideration must be given to the supporting of the driving spindles. My invention contemplates means for automatically supporting the mill spindles, and particularly the top spindle, in correct position for roll changing when the working rolls are removed from the mill. This permits replacement of the removed roll without the necessity of touching the spindles or adjusting them for proper elevation.

In the accompanying drawings, I have shown largely diagrammatically, by way of illustration only, certain preferred embodiments of the present invention. In the drawings:

Figure 1 is a diagrammatic end elevation study of a four-high mill illustrating the working rolls supported in their maximum open position;

Figure 2 is a view similar to Figure 1 illustrating the mill adjusted so as to bring the surfaces of the working rolls into more closely adjacent relationship;

Figure 3 is a view similar to Figures 1 and 2 illustrating the parts in a different relationship which they are preferably caused to assume prior to the time of effecting removal of the upper working roll, for example;

Figure 4 is a view similar to Figure 3 illustrating a desirable relationship of the parts to permit changing of the upper backing-up roll;

Figure 5 is a detailed sectional view, on an enlarged scale, illustrating a portion of the structure for effecting roll balancing and supporting;

Figure 6 is a front elevational view of a portion of the inner face of the housing window illustrated in Figure 5;

Figure 7 is a transverse sectional view along the line VII—VII of Figure 6 looking in the direction of the arrows;

Figure 8 is a view similar to Figure 5 illustrating the construction of a portion of the bearings for the upper working and backing-up rolls;

Figure 9 is a view similar to Figure 6 of the face of the portion of the window shown in Figure 8;

Figure 10 is a view partly in side elevation and partly in section illustrating a spindle arrangement in accordance with the present invention;

Figure 11 is a detailed sectional view on the line XI—XI of Figure 10;

Figure 12:
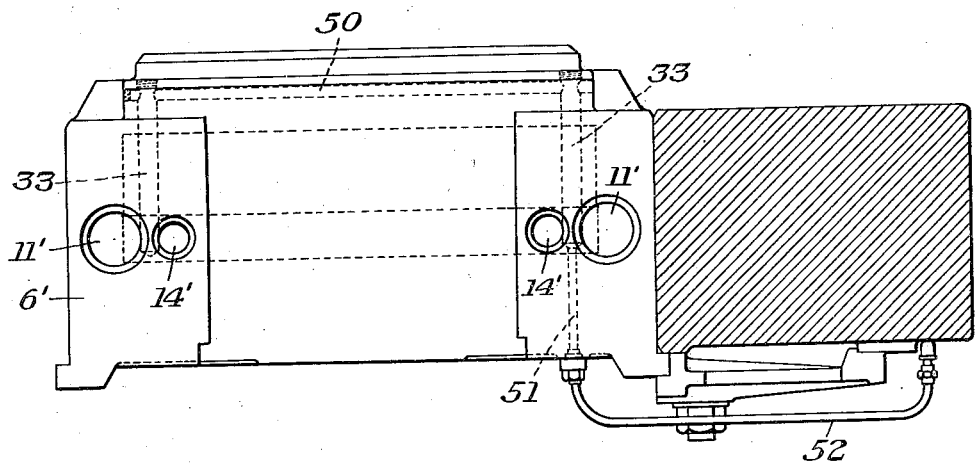
Figure 12 is a view partly in section and partly in plan of one form of balancing means in accordance with my invention.

For the purpose of a better preliminary understanding of the present invention, reference will first be made to the diagrammatic showings of Figures 1 to 4, both inclusive. In these figures there is indicated in outline, and largely diagrammatically, a mill comprising a lower backing-up roll 2 with which cooperates a working roll 3, and an upper backing roll 4 with which cooperates a working roll 5. In these figures I have illustrated the backing roll 2 as carried in a bottom chuck 6 which is shaped to receive the bearing chuck 7 for the bottom working roll 3. In like manner the chuck 8 for the top backing roll 4 is shaped to receive and cooperate with the chuck 9 for the top working roll 5. The present invention, apart from the features hereinafter particularly explained, is not limited to any special forms of bearing chucks, the invention being adaptable generally to the use of chucks having the general characteristics considered desirable in accordance with present mill construction.

In the embodiment illustrated in these figures, the longitudinal axes of all of the rolls lie in a common plane, and the position of the upper chuck 8 determines the distance D between the adjacent faces of the working rolls. To vary this distance there is conveniently provided any suitable form of screwdown mechanism 10 adapted to cooperate with the upper chuck 8 and force it downwardly bodily in opposition to the roll balancing means which will now be described.

The desired balancing in accordance with the present invention is conveniently accomplished by the utilization of hydraulic means carried by the lower chuck 6 and effective against the upper chucks 8 and 9. As shown in the figures under consideration, the desired results are accomplished by providing within the lower chuck 6 a cylinder 11 adapted to receive fluid under pressure from any desired source, and effective for urging a piston 12 in an upward direction. In like manner, the lower chuck 6 provides a cylinder 14 for the reception of a second piston 15. The piston 12 bears at its upper end against a lower surface 16 on the upper chuck 8, while the upper end of the piston 15 bears against a similar surface 17 on the lower end of a ram 18 slidably mounted within the chuck 8 and bearing at its upper end against an offset 19 formed integrally with or projecting from the upper chuck 9.

From the foregoing description, it will be apparent that if a fluid medium, such as oil, is supplied to the cylinders 11 and 14 under sufficient pressure, the pistons 12 and 15 will be forced upwardly to the limit of their permissible strokes. The upward movement of the piston 12 will be effective for supporting the chuck 8 and its backing roll 4, while the piston 15 will be effective through the ram 18 for holding the chuck 9 and its working roll 5 upwardly into frictional driving engagement with the backing roll 4. The absolute position of the backing roll 4 and working roll 5 will in turn be controlled by the position of the screwdown mechanism 10. With this mechanism substantially in the position illustrated in Figure 1, the rolls 4 and 5 will be in their upper position providing a pass D of maximum width, while with the mechanism 10 in the position illustrated in Figure 2, this corresponding distance will be considerably reduced, thereby enabling the mill to effect the rolling of thinner gauge material.

Figures 1 and 2 illustrate the parts of a four-high mill in different positions in which they are effective for performing a rolling operation. It may be assumed, however, that for some reasons it is desirable to effect removal of the top working roll 5. In such case, the pressure in the cylinders 11 and 14 is continued. Cooperating with the piston 15 is a stop 20, hereinafter more fully described, which stop limits the potential stroke in an upward direction of the piston 15. In Figure 3, the piston is shown as against this stop whereby its upward movement has been definitely checked. Thereafter, continued upward movement of the piston 12 will bring an upper supporting surface 21 on the chuck 8 into supporting engagement with the projection 19, before described, on the chuck 9. In this position of the parts, the ram 18 will lie idly within the upper chuck 8 so that the chuck 9 and its roll 5 are carried directly by the chuck 8. In this position, which provides an appreciable space S between the rolls 4 and 5, it will be apparent that the working roll 5, together with its chuck, may be easily moved endwise from the mill housing.

The working roll 5 having been removed, it is possible that it may be desirable to remove the upper roll 4, for example. In such case, pressure will be relieved from the cylinders 11 and 14, thereby permitting the pistons 12 and 15 to move in a downward direction to an extent sufficient to bring the lower face 22 of the upper chuck 8 into supporting engagement with the upper face 23 of the lower chuck 6. This position of the parts is illustrated diagrammatically in Figure 4 of the drawings. With the top backing-up roll chucks resting freely upon the top of the bottom backing-up roll chucks and clear of the screwdown mechanism 10, removal of the top roll is easily accomplished.

From the foregoing description, it will be apparent that a structure of the general character referred to provides means whereby the rolls of a mill may be continuously balanced during the mill operation, and also provides means whereby either the upper working roll, or the upper backing roll may be expeditiously removed from the mill housing. These rolls having been removed, it is apparent that the lower rolls may be likewise removed in any usual manner, and with them, the pistons and cylinders by which the desired balancing is effected.

Reference will now be made to the detailed showing of Figures 5, 6 and 7 wherein parts corresponding to the parts already described are designated by the same reference characters having a prime affixed thereto. From Figure 5 it is apparent that the cylinders 11' and 14' are formed directly in the lower chuck 6' by suitable coring and machining operation. While this construction is preferable due to its simplicity, it will be apparent that replaceable cylinders may be utilized if desired.

The piston 12' preferably has a suitable packing 24 at the lower end thereof secured in place by means of nuts and lock nuts 25. A suitable seal 26 may likewise be provided at the top of the cylinder for the purpose of keeping out grit and dirt. In like manner the plunger 15' has a similar bottom packing 27 with a top seal 28. In order that the plunger 14' may more effectively cooperate with the stop 20, it is provided throughout a portion of its length with a flat face 29, as shown in detail in Figure 7, providing opposed shoulders 30 and 31 lying on opposite sides of the stop 20. In Figure 5 the plunger 15' is shown in its extreme upper position, corresponding to the position of Figure 3, with the shoulder 30 in engagement with the stop. This stop, as illustrated in Figure 6, comprises a transversely extending bar or key lying in a slot in back of a liner 32 and carried by the lower chuck 6'.

It will also be apparent from Figure 5 that in the illustrated embodiment the two cylinders 11' and 14' are interconnected through a common fluid delivery and escape port 33 drilled in the chuck 6' adjacent the lower ends of the cylinder.

In Figures 8 and 9 parts corresponding to parts described in detail in connection with Figures 1 to 4 are designated by the same reference character having a prime affixed thereto. From a consideration of these figures it will be apparent that the upper chuck 8' is provided with liners 34 similar to the liners 32, and providing a passage within which one of the rams 18' is adapted to move. Each of these rams, as indicated in Figure 9, is preferably of exactly the same length as the length of the portion of the chuck 8' which carries the same. Lateral projections 35 from the ram serve to keep it from falling out of the chuck when the backing-up rolls and their chucks are removed from the mill.

From a consideration more particularly of Figure 3 of the drawings, it will be apparent that in order to effect removal of the upper working roll, for example, it is only necessary that the screwdown mechanism 10 be run up to a height sufficient to insure that the weight of the top working roll and its chuck is carried in the windows of the backing-up roll chuck. This condition is indicated either by observing the relationship of the parts 19 and 21, or by observing the fact that the ram is clear of the top of the piston 15. This condition having been obtained, the elevation of the center of the working roll is always constant for a roll changing operation relative to the bottom backing-up roll chuck. The advantages of such a definite relationship will be more fully apparent by reference to Figures 10 and 11 of the drawings wherein I have illustrated a driving spindle 36 for the upper working roll and a similar spindle 37 for the lower working roll. The weight of these spindles is carried by spindle carrier bearings 38 and 39, respectively, which are in turn supported by bars 40 and 41 fulcrumed at 42 and 43 on supporting brackets 44 and 45. The bottom spindle may be balanced by springs 46, as shown, but for the top spindle I preferably utilize a counterweight 47 of sufficient weight to slightly overbalance the weight of the spindle. This counterweight is preferably provided with a stop plate 48 below the same, so that when the roll is disconnected from the spindle, the counterweight will raise the spindle to the most advantageous position for roll changing. This position corresponds to one in which the center of the spindle is approximately in line with the center of the working roll with the working roll in roll changing position. In these figures of the drawings I have indicated mill spindles and universal couplings of the general character disclosed in my United States Patent No. 1,359,601 of November 23, 1920, such spindles being highly desirable by reason of the ease with which a roll end may be withdrawn from engagement with the spindle. It will be understood, however, that the utility of the invention is not limited in this respect.

Should it be desired to change the elevation of the bottom backing-up roll in order to compensate for roll wear, this may be accomplished either by adding liners, or changing to liners of greater thickness under the bottom of the backing-up roll chucks and between these chucks and the mill housings. Such a change, although made infrequently, can be compensated for by a corresponding decrease in the effective plane of the stop 48 in such manner that the free position of the spindle will still be substantially at the center of the roll when the screws are run up to roll changing position. This feature of balancing the spindles in combination with a balancing means for the rolls themselves is of distinct advantage from the standpoint of ease of roll changing.

Figure 13:
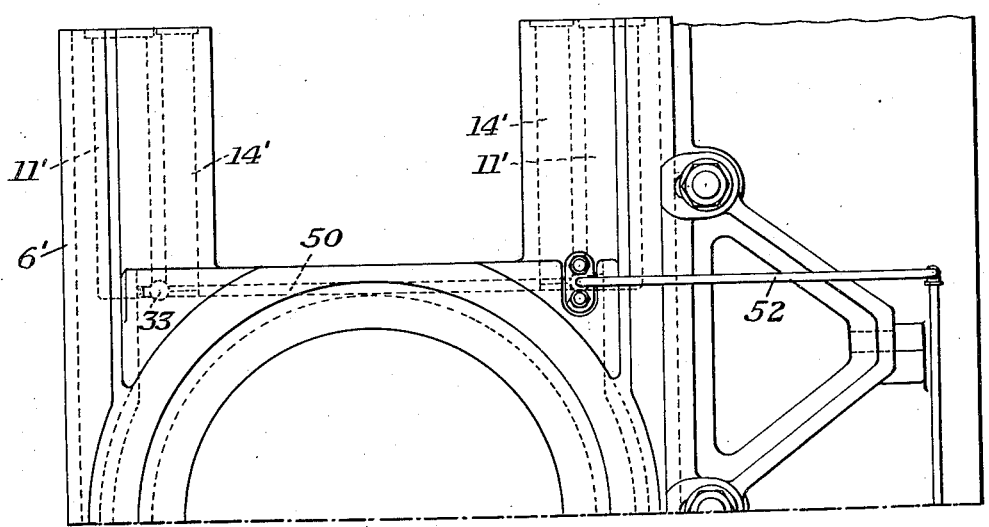
Figure 13 is a side elevational view of the structure illustrated in Figure 12.

Figures 12 and 13 illustrate in somewhat greater detail portions of the structure shown in Figure 5. From Figure 12 it will be apparent that the cylinder openings 11' and 14' are symmetrically arranged in opposite sides of the lower chuck 6', the centers of the cylinders lying on substantially the median line of the chuck. This figure further shows the passages 33 interconnected at one end by a transversely extending passage 50 formed in the lower chuck in any desired manner. The pressure fluid is indicated as being delivered to one of the passages 33 through a drilled opening 51 to which is coupled a pressure line 52 leading to a suitable control valve, such as a 3-way valve, pump and accumulator. These parts may all be of any desired construction, the accumulator obviously being utilized to afford the desired working pressure on the fluid, and the 3-way valve for effecting a connection such that fluid may either be delivered to the cylinders by the pump or removed from the cylinders.

Figure 14:
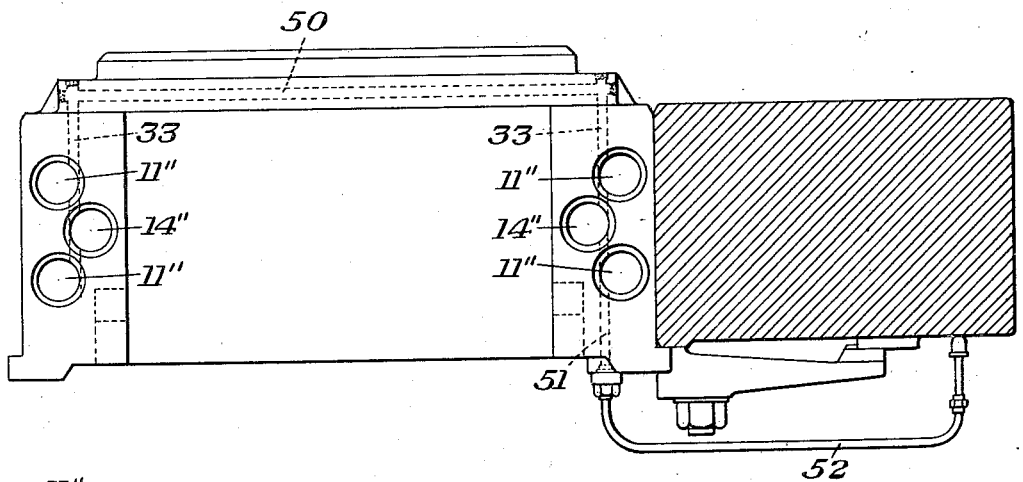
Figure 14 is a view similar to Figure 12 illustrating another embodiment of my invention.
Figure 15:
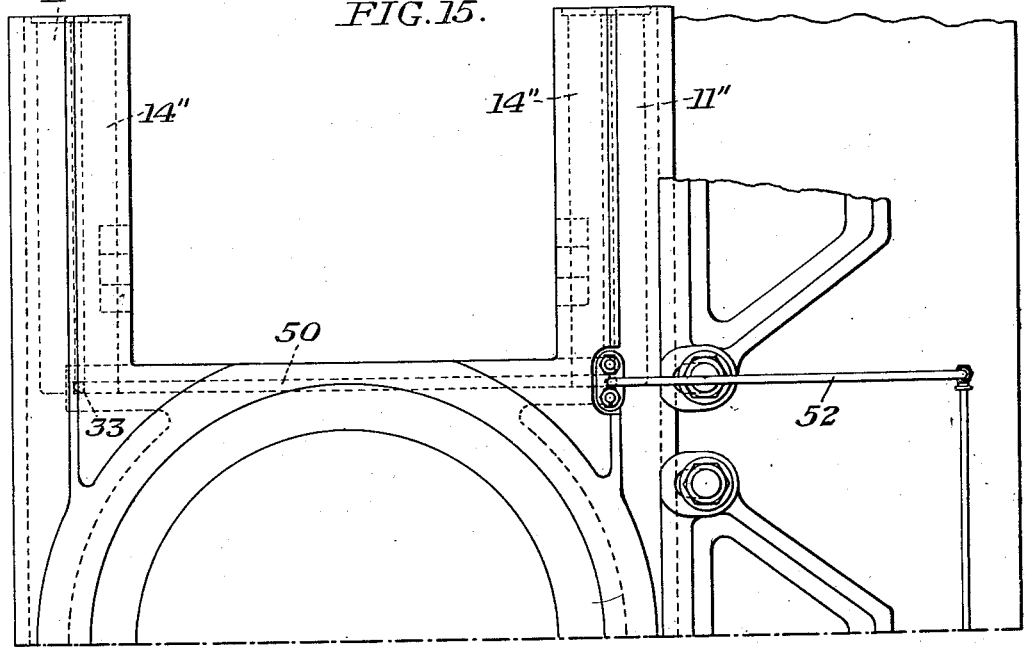
Figure 15 is a side elevational view similar to Figure 13, of the structure shown in Figure 14.

In Figures 14 and 15 there is illustrated a slightly modified embodiment of the invention wherein a single cylinder 14" is used in each side of the chuck for supporting the upper working roll and two offset cylinders 11" are provided for supporting the upper backing roll. The connections to the cylinders are of the general construction heretofore described.

From the foregoing it will be apparent that I have provided a roll balancing structure wherein all of the parts effective for accomplishing the desired balancing are carried directly within the physical convenience of the mill housing and not above, alongside of or below the housing. By reason of their positon, they are readily accessible for inspection or repair as may be necessary.

Their preferred arrangement is such that the parts are removable with the chucks, the pistons supporting the upper movable parts reacting directly against the chucks for the lower rolls.

Further advantages arise from the combination of roll balancing means, preferably of the general nature herein contemplated, in combination with balanced spindles having balancing means of such nature that the spindles are moved to a normal roll changing position which is coordinated with the roll changing position of the rolls themselves.

While I have herein illustrated and described certain preferred embodiments of my invention, it will be understood that changes in the construction and arrangement of the parts shown, as well as in the construction and type of the mill, may be made without departing from the spirit of my invention or the scope of my broader claims.

I claim:

1. In a backed-up mill, a plurality of working rolls, a plurality of backing rolls, chucks for said working and backing rolls, cylinder and piston means carried by the chucks of one of the backing rolls for supporting the chucks of another of the backing rolls, and other cylinder and piston means carried by the chucks of said one of said backing rolls for supporting the chucks of one of the working rolls.

2. In a backed-up mill, lower working and backing rolls, chucks for the backing roll and chucks for the working roll housed in the backing roll chucks, upper working and backing rolls, chucks for the upper rolls, cylinder and piston means carried by said lower backing roll chucks for supporting the chucks of the upper working roll, and other cylinder and piston means carried by said lower backing roll chucks for supporting the upper backing roll chucks.

3. In a backed-up mill, a plurality of working rolls, a plurality of backing rolls, chucks for said working and backing rolls, cylinder and piston means carried by the chucks of one of the backing rolls for supporting the chucks of another of the backing rolls, other cylinder and piston means carried by the chucks of said one of said backing rolls for supporting the chucks of one of the working rolls, and means for limiting the stroke of said last-mentioned piston means.

4. In a rolling mill, upper and lower backing rolls, chucks for rotatably supporting said rolls, upper and lower working rolls disposed between said backing rolls, chucks for rotatably supporting the working rolls, the upper working roll chucks being housed in the upper backing roll chucks, the lower working roll chucks being housed in the lower backing roll chucks, and hydraulic jacks in the lower backing roll chucks for supporting the top backing roll chucks and top working roll chucks.

5. In a rolling mill, upper and lower backing rolls, chucks for rotatably supporting said rolls, upper and lower working rolls disposed between said backing rolls, chucks for rotatably supporting the working rolls, the upper working roll chucks being seated in the upper backing roll chucks, the lower working roll chucks being seated in the lower backing roll chucks, hydraulic jacks in the lower backing roll chucks for supporting the top backing roll chucks and top working roll chucks, and means for supporting the top working roll chucks from the top backing roll.

6. In a rolling mill, upper and lower backing rolls, chucks for rotatably supporting said rolls, upper and lower working rolls disposed between said backing rolls, chucks for rotatably supporting the working rolls, the upper working roll chucks being housed in the upper backing roll chucks, the lower working roll chucks being housed in the lower backing roll chucks, hydraulic jacks in the lower backing roll chucks for supporting the top backing roll chucks and top working roll chucks, and means for supporting the top working roll chucks from the top backing roll, the top backing roll chucks having means capable of limited movement therein for engagement by said jacks.

7. In a rolling mill, top and bottom backing rolls, chucks for adjustably supporting said rolls, a working roll between said backing rolls, and chucks for rotatably supporting the working roll, hydraulic jacks in said bottom backing roll chucks for exerting an upward force on the top backing roll chucks, and means for suspending the working roll chucks from the top backing roll chucks on predetermined upward movement of the latter.

8. In a rolling mill, top and bottom backing rolls, chucks for adjustably supporting said rolls, a working roll between said backing rolls, chucks for rotatably supporting the working roll, hydraulic jacks in said bottom backing roll chucks for exerting an upward force on the top backing roll chucks, hydraulic jacks in said bottom backing roll chucks for exerting an upward force on the working roll chucks, means for limiting the movement of said last-mentioned jacks, and means for suspending the working roll chucks from the top backing roll chucks on movement of the working roll beyond the limit of movement of said second-mentioned jacks.

9. In a rolling mill, top and bottom backing rolls, chucks for rotatably and adjustably supporting said rolls, a working roll between said backing rolls, hydraulic jacks in the bottom backing roll chucks for applying an upward force to the top backing roll chucks, the working roll chucks having laterally extending means for engaging portions of the top backing roll chucks on predetermined upward movement thereof.

10. In a rolling mill, top and bottom backing rolls, chucks for rotatably and adjustably supporting said rolls, a working roll between said backing rolls, hydraulic jacks in the bottom backing roll chucks for applying an upward force to the top backing roll chucks, the working roll chucks having laterally extending means for engaging portions of the top backing roll chucks on predetermined upward movement thereof, and means for applying an upward force to the working roll chucks including hydraulic jacks in the bottom backing roll chucks, and separable thrust transmitting members extending through portions of the top backing roll chucks.

11. In a rolling mill, top and bottom backing rolls, top and bottom working rolls between said backing rolls, means for exerting an upward force on the top backing roll, means for suspending the top working roll from the top backing roll upon a predetermined elevation of the latter, spindles for driving said working rolls, a cradle for supporting the spindle driving the top working roll, a counterweight for causing the cradle to support the spindle, and means for limiting movement of the counterweight to position the end of the spindle engaging the top working roll at a predetermined level upon said predetermined elevation of the top backing roll.

12. In a rolling mill, a pair of housings, a roll journaled within said housings, bearing chucks adjustable in said housings for rotatably supporting said roll, means for exerting an upward thrust upon said bearing chucks, and means for suspending said chucks independently of said thrust exerting means, a spindle for driving said roll, means for exerting an upward thrust on the spindle, and means for preventing the application of the upward thrust to the spindle after the roll has been raised to the point where it is suspended independently of said first-mentioned thrust exerting means.

13. In a rolling mill, top and bottom backing rolls, bearing chucks therefor, top and bottom working rolls and bearing chucks therefor, means in the bottom backing roll chucks for exerting an upward thrust on the chucks of the top backing and working rolls, a spindle for the top working roll, means for exerting an upward thrust on said spindle, and means for rendering ineffective the means exerting a thrust on said spindle, on predetermined upward movement of the roll driven thereby.

14. In a backed-up mill, lower working and backing rolls, chucks for the backing roll, and chucks for the working roll housed in the backing roll chucks, upper working and backing rolls, chucks for the upper rolls, cylinder and piston means carried by said first-mentioned chucks for supporting the chucks of the upper backing roll, other cylinder and piston means carried by said first-mentioned chucks for supporting the upper working roll chucks, and means for limiting the stroke of said last-mentioned piston means.

15. In a rolling mill, a pair of housings, a pair of backing rolls journaled within said housings, a pair of bearing chucks in the housings for rotatably supporting each of the rolls, a working roll between said backing rolls, chucks for supporting the working roll housed in the chucks for one of said backing rolls, and hydraulic jacks in the chucks of one of the backing rolls for supporting the chucks of said working roll and the chucks of one of said backing rolls.

16. In a rolling mill, a pair of housings, a pair of backing rolls journaled within said housings, a pair of bearing chucks in the housings for rotatably supporting each of the rolls, a working roll between said backing rolls, chucks for supporting the working roll housed in the chucks of one of said backing rolls, hydraulic jacks in the chucks of one of the backing rolls for supporting the chucks of said working roll and the chucks of one of said backing rolls, and means for supporting the working roll chucks from the chucks of one of said backing rolls.

17. In a rolling mill, a pair of housings, a pair of backing rolls journaled within said housings, a pair of bearing chucks in the housings for rotatably supporting each of the rolls, a working roll between said backing rolls, chucks for supporting the working roll housed in the chucks of one of said backing rolls, hydraulic jacks in the chucks of one of the backing rolls for exerting an upward thrust on the chucks of said working roll and the chucks of one of said backing rolls, and means for supporting the working roll chucks from the chucks of one of said backing rolls including means in the last-mentioned chucks, for engagement by said jacks.

18. In a rolling mill, upper and lower backing rolls, chucks for rotatably supporting said rolls, upper and lower working rolls disposed between said backing rolls, chucks for rotatably supporting the working rolls, hydraulic jacks in the chucks of one of the backing rolls for supporting the top backing roll chucks, and other hydraulic jacks in the chucks of one of the backing rolls for supporting the top working roll chucks.

19. In a rolling mill, upper and lower backing rolls, chucks for rotatably supporting said rolls, upper and lower working rolls disposed between said backing rolls, chucks for rotatably supporting the working rolls, hydraulic jacks in the chucks of one of the backing rolls for supporting the top backing roll chucks, other hydraulic jacks in the chucks of one of the backing rolls for supporting the top working roll chucks, and means for supporting the top working roll chucks from the top backing roll.

20. In a rolling mill, upper and lower backing rolls, chucks for rotatably supporting said rolls, upper and lower working rolls disposed between said backing rolls, chucks for rotatably supporting the working rolls, hydraulic jacks in the chucks of one of the backing rolls for supporting the top backing roll chucks, other hydraulic jacks in the chucks of one of the backing rolls for supporting the top working roll chucks, and means for supporting the top working roll chucks from the top backing roll, the top backing roll chucks having means capable of limited movement therein for engagement by said jacks to support the top working roll chucks independently of the top backing roll chucks.

LORENZ IVERSEN.

CERTIFICATE OF CORRECTION.

Patent No. 1,935,091.            November 14, 1933.

LORENZ IVERSEN.

It is hereby certified that error appears in the printed specification of the above numbered patent requiring correction as follows: Page 4, lines 102 and 104, claim 5, for "seated" read housed; and that the said Letters Patent should be read with these corrections therein that the same may conform to the record of the case in the Patent Office.

Signed and sealed this 19th day of December, A. D. 1933.

Richard Spencer
Acting Commissioner of Patents.

(Seal)